United States Patent
Ng et al.

(10) Patent No.: US 8,418,322 B2
(45) Date of Patent: Apr. 16, 2013

(54) COOKWARE HANDLE

(75) Inventors: Kenny Ng, Guandong (CN); Tanveer Khan, Chonburi (TH)

(73) Assignee: Meyer Intellectual Properties Limited (VG)

( * ) Notice: Subject to any disclaimer, the term of this patent is extended or adjusted under 35 U.S.C. 154(b) by 0 days.

(21) Appl. No.: 13/330,454

(22) Filed: Dec. 19, 2011

(65) Prior Publication Data

US 2012/0085773 A1   Apr. 12, 2012

Related U.S. Application Data

(62) Division of application No. 12/122,858, filed on May 19, 2008, now Pat. No. 8,104,163.

(60) Provisional application No. 60/939,392, filed on May 22, 2007.

(51) Int. Cl.
*B21K 5/00* (2006.01)
*A47J 27/00* (2006.01)
*A47J 36/00* (2006.01)
*A47J 37/01* (2006.01)

(52) U.S. Cl.
USPC .......... 16/431; 29/527.1; 220/573.1; 220/752

(58) Field of Classification Search ................. 29/527.1, 29/242; 16/430, 431; 220/752, 758, 573.1
See application file for complete search history.

(56) References Cited

U.S. PATENT DOCUMENTS

| | | | |
|---|---|---|---|
| 204,319 A * | 5/1878 | Grosjean ..................... 220/752 |
| 401,419 A * | 4/1889 | Devore ....................... 220/753 |
| 578,020 A * | 3/1897 | Morse .......................... 16/431 |
| 1,762,679 A * | 6/1930 | Crosman, Jr. ................. 30/343 |
| 1,831,752 A * | 11/1931 | Reinold ....................... 220/752 |
| 1,900,565 A * | 3/1933 | Kircher ....................... 220/753 |
| 1,965,354 A * | 7/1934 | Patock ......................... 16/421 |
| 2,504,344 A * | 4/1950 | Morrison, Jr. et al. ........ 220/753 |
| 2,521,463 A * | 9/1950 | Kircher ....................... 220/752 |
| 2,815,527 A * | 12/1957 | Hollaway, Jr. et al. ....... 220/753 |
| 2,872,561 A * | 2/1959 | Humphrey ................... 219/441 |
| 3,648,887 A * | 3/1972 | Hartley ....................... 220/759 |
| 4,209,877 A * | 7/1980 | Colasent ...................... 220/753 |
| 6,247,204 B1 * | 6/2001 | Hamby et al. ................. 16/436 |
| 6,648,535 B2 * | 11/2003 | Ferrara, Jr. ..................... 401/6 |
| 7,490,732 B2 * | 2/2009 | Wasserman et al. .......... 220/753 |
| 7,624,893 B2 * | 12/2009 | Hoff et al. .................... 220/753 |
| 7,819,278 B2 * | 10/2010 | Ferron ......................... 220/755 |
| 8,132,689 B2 * | 3/2012 | Pasquini ...................... 220/755 |
| 2003/0029002 A1 * | 2/2003 | Willat ............................ 16/430 |
| 2003/0084545 A1 * | 5/2003 | Cheng ........................... 16/430 |
| 2006/0213033 A1 * | 9/2006 | Wasserman et al. ........... 16/421 |
| 2006/0237470 A1 * | 10/2006 | Zanner et al. ................ 220/752 |
| 2007/0204435 A1 * | 9/2007 | Pangborn ....................... 16/430 |
| 2007/0251059 A1 * | 11/2007 | You .............................. 16/430 |
| 2008/0092338 A1 * | 4/2008 | Wu .............................. 16/430 |
| 2008/0245805 A1 * | 10/2008 | Ferron ......................... 220/752 |
| 2009/0084803 A1 * | 4/2009 | Pasquini ...................... 220/753 |
| 2010/0101364 A1 * | 4/2010 | Seidl ............................ 74/552 |
| 2011/0073602 A1 * | 3/2011 | Musil et al. ................ 220/573.2 |
| 2011/0187137 A1 * | 8/2011 | Wales ............................ 294/7 |

* cited by examiner

*Primary Examiner* — David P. Bryant
*Assistant Examiner* — Christopher Koehler
(74) *Attorney, Agent, or Firm* — Edward S. Sherman

(57) ABSTRACT

A cookware handle with a soft non-slip surface is formed by molding elastomeric composition around a core or elongated member that connects a flange portion and the terminal end or hanging portion of the handle. The core or elongated member has a relatively narrow cross-section to minimize heat transfer from the pot so that the gripping portion remains cool during cooking.

20 Claims, 7 Drawing Sheets

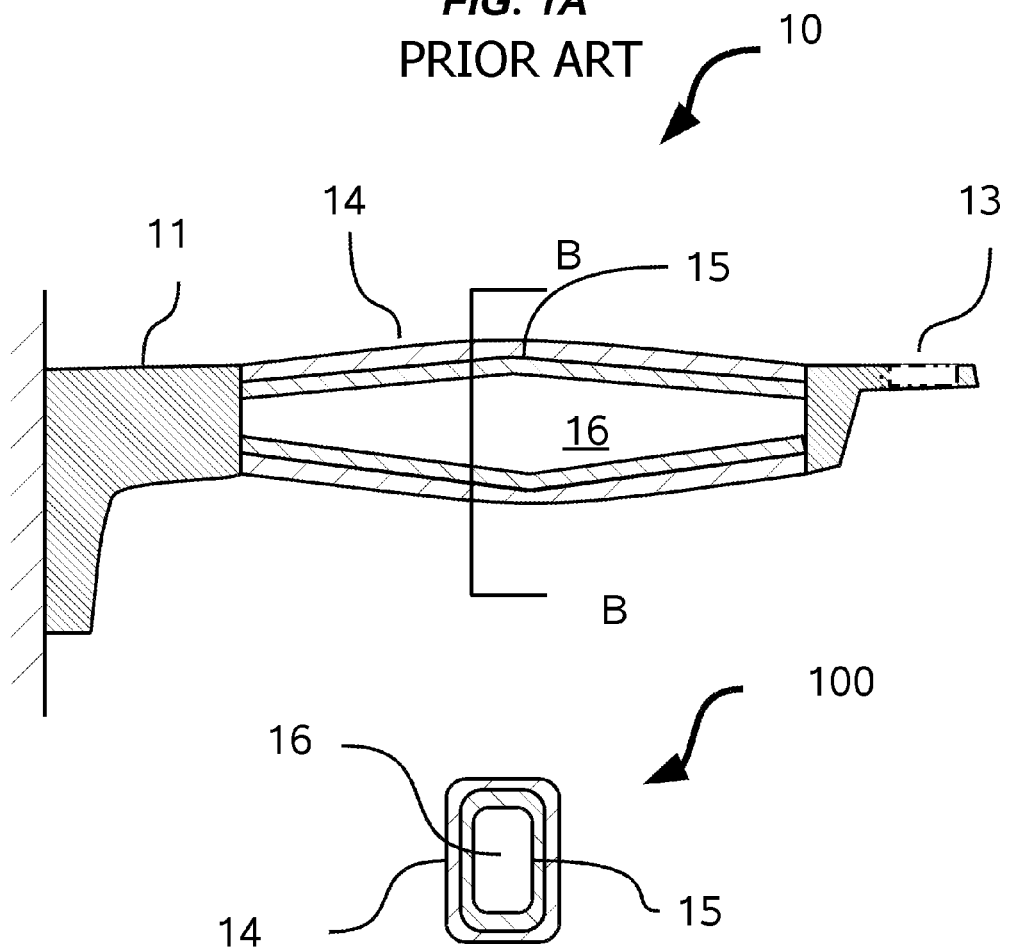

COOKWARE HANDLE

CROSS REFERENCE TO RELATED APPLICATIONS

The present application claims the benefit of priority to the U.S. provisional application having Ser. No. 60/939,392 for a "Cookware Handle" filed on May 22, 2007, which is incorporated herein by reference.

The present application is also a Division of and claims the benefit of priority to the U.S. Non Provisional patent application of the same title having application Ser. No. 12/122,858 that was filed on May 19, 2008, which issued as U.S. Pat. No. 8,104,163 on Jan. 31,2012, and is incorporated herein by reference.

BACKGROUND OF INVENTION

The present invention relates a handle for an article of cookware, and more particularly to a cookware handle having a soft but resilient grip portion that is thermally insulating.

Cookware handles are primarily fabricated of metal or polymers, in particular, thermoset resin such as phenolic plastic and the like. Regardless of the type of material used to form a cookware vessel handle, an important attribute to many consumers is that it remain cool during cooking. This is preferably accomplished by first minimizing heat transfer from the cookware article, and second, in the case of metal handles, providing a high surface area for the radiation of heat from the handle. To the extent that a cookware article is fabricated at least in part from plastic, the superior thermal insulating properties of plastic minimize heat transfer to the grip portion held by the user.

Another important attribute of a cookware handle is that the grip is not slippery, with such property being exacerbated when the user's hands are wet or the contaminated with cooking oil and the like. Further, many consumers now prefer kitchen utensils that also have a grip portion of a soft resilient material, such as a rubber or elastomer.

From a utilitarian standpoint the cookware handle must be strong enough to support the cookware vessel. Further, as most cookware is now stored by hanging from a hole situated on the end of the cookware handle beyond the gripping region, it is preferable that metal, rather than plastic be used for such cookware handles.

Metal cookware handles covered by a non-slip rubber sleeve are known however, the sleeve being intentionally thin does not provide a soft grip.

It is therefore an object of the present invention to provide a handle for an article of cookware does not reach excessive temperatures during cooking at a very soft rubber grip portion, to reduce the stress on the user's hands and provide a non-slip surface.

SUMMARY OF INVENTION

In the present invention, the first object is achieved by providing a cookware handle having a flange portion with a first end for attachment to the cookware vessel and a second or terminal end generally for hanging, at least one elongated member connects the flange portion and the hanging portion, and an elastomeric outer layer surround said elongated member, wherein the diameter of the elongated member is less than about 6/10 of the external diameter of the handle.

A second aspect of the invention is characterized in that the handle further comprises at least one strap covered by the elastomer outer layer that extends substantially parallel to the elongated member and is connected at least at one end to at least one of the flange portion, the second end and the elongated member.

Another aspect of the invention is characterized in that the handle further comprises at least one strap covered by the elastomer outer layer disposed along the elongated member and curved to substantially follow the external contour of the elastomeric outer layer.

Another aspect of the invention is that this at least one strap is a flexible metal ribbon having a substantially narrower thickness than the elongated member.

Another aspect of the invention is that the elastomeric resin that comprises the outer layer fills the gap between the at least one strap and the elongated member and surrounds both the at least one strap and the elongated member.

Another aspect of the invention is characterized in that the handle further comprises at least one of the flange end and the second end having either an external protrusion or cavity or like complimentary mating feature for coupled engagement with the elongated member.

Another aspect of the invention is characterized by a process for forming the handle that comprises the steps of providing a flange end member having a cookware connecting curved portion and a narrow extending portion on the opposite side of the curved portion, providing a hanging end member with an outer end that forms the end of the cookware handle and an internal end opposite the outer end, providing at least one elongated member for connecting the flange end member and the hanging end member, the elongated member having a diameter that is less than 6/10 of the diameter of the adjacent flange end and hanging end members, connecting opposing ends of the elongated portion to each of the internal end of the hanging end member and the narrow extending portion of the flange end member, and then molding an elastomeric covering over the connecting portion to fill the gap between the flange end and hanging end members whereby a soft resilient grip member surrounds the elongated member.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a longitudinal cross-sectional elevation of a prior art cookware handle. FIG. 1B is a transverse cross-sectional elevation of the handle of FIG. 1A taken at reference line B-B.

DETAILED DESCRIPTION

Figure 2A:
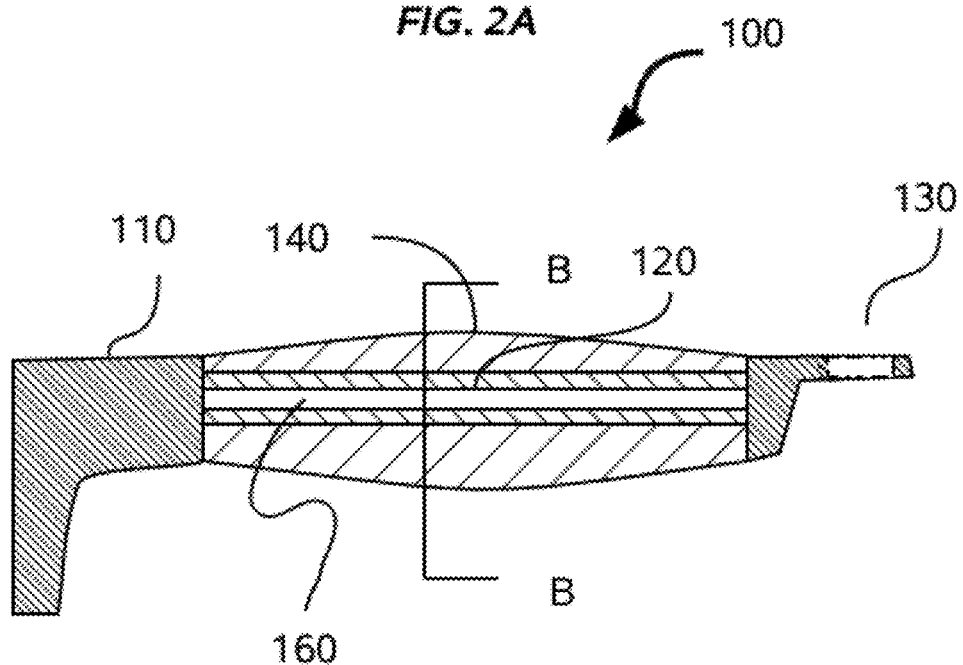
FIG. 2A is a longitudinal cross-sectional elevation of a first embodiment of a cookware handle.

Referring to FIGS. 2 through 7, wherein like reference numerals refer to like components in the various views, there is illustrated therein a new and improved cookware handle, generally denominated 100 herein.

FIG. 1 illustrates a prior art hollow handle 10 with a rubber grip 14 disposed intermediate between the flange portion 11; that is connected to the cooking vessel and the hanging portion 13. The rubber grip is disposed around a metal shell 15, having a hollow interior 16.

The handle 10 is partially insulated by the hollow shell 15, while the grip 14, provides some insulation, primarily provides slip resistance to the user's hand. When the grip is soft is spreads the gripping force over the metal shell 15 to reduces high pressure spots on the user's hand for greater comfort. However, as the grip 14 is only a thin skin of 2-3 mm thick covering the metal shell 15, its compliance is limited. If the grip is made of very soft elastomer it deforms too easily and the user feels the underlying metal. Thus the grip portion, owing to its thinness, should not deform more than about a 1-2 mm under hand presser, providing a lower barrier its softness.

Figure 2B:
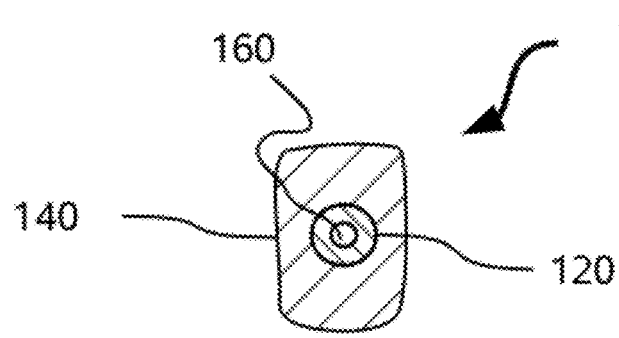
FIG. 2B is a transverse cross-sectional elevation of the handle of FIG. 2A taken at reference line B-B.

In accordance with the present invention, FIG. 2 is a longitudinal cross-section elevation of one embodiment in which the flange 110 is connected to the hanging portion 130 by a narrow elongated member or rod 120. The soft elastomer, which is preferably a thermoset silicone rubber, 140 surrounds rod 120, being flush with the adjoining edges flange 110 and hanging portion 130. The rod 120, like the shell 14 of the prior art article shown in FIG. 1, has a hollow core 160 and thus a relatively narrow cross-section to minimize heat transfer from the cooking vessel so that the gripping portion remains cool during cooking. However, in contrast to the shell 15, the rod 120 has a much narrower outer diameter, typically about 9 to 12 mm (versus 16-20 mm for shell 15) to allow for a thicker soft elastomer layer to be used. Preferably the diameter of the elongated member 120 is less than about $6/10$ the diameter of the external dimension of handle 100 at the mid-section. More preferably, the diameter or the rod is less than about ½ the diameter of the external dimension of handle 100 at the mid-section, so that the soft elastomer portion can be at least about 4-6 mm thick, and more preferably a thickness of about 6 mm in most portions of the handle mid section.

The soft elastomer 140, now being thicker than thin grip layer 14, improves the users comfort, as it is better able to spread the gripping force over the elongated member 120. Elongated member 120 preferably has a hollow core to reduce weight yet provide sufficient stiffness. Further, as a very soft elastomer could tear rather easily, another benefit of the invention, as will be further described with respect to FIG. 4-7, is that an additional ribbon or strap is provided to reinforce and add resilience to the soft elastomer.

Suitable thermosetting elastomeric materials are well known in the art, as are the method of molding them into different shapes, as is disclosed in the following exemplary patents that are incorporated herein by reference: U.S. Pat. Nos. 5,569,688; 5,626,811; 5,973,058; and 6,113,827. Moreover, thermoplastic elastomers are not excluded form use in this invention per se, so long as they have a high enough melting or phase transition temperature to be compatible with cooking or can be cross-linked after molding around elongated member 120.

It should be appreciated that the reference to the terminal end 130 of handle 100 as a hanging portion does not require that it contain a hole as shown for hanging from a pot rack and the like, but rather for the convenience of referring to the portion by its usual function. Further, it should be understood that the soft elastomer is preferably molded with a surface texture that contributes to the non-slip properties, that is a finish that is preferably not perfectly smooth.

Figure 3A:
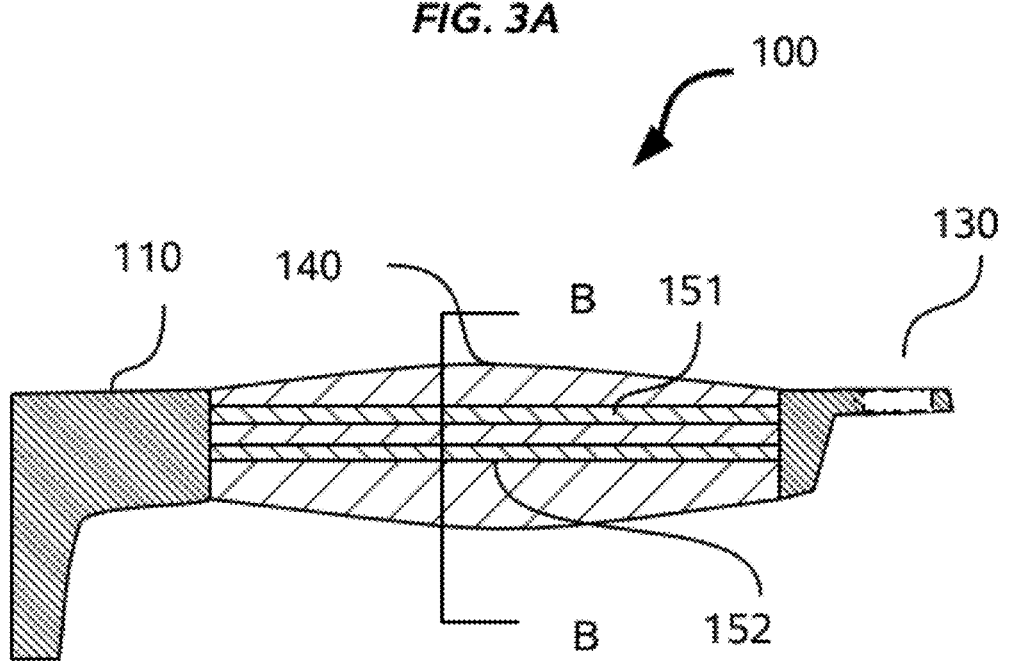
FIG. 3A is a longitudinal cross-sectional elevation of a second embodiment of a cookware handle.
Figure 3B:
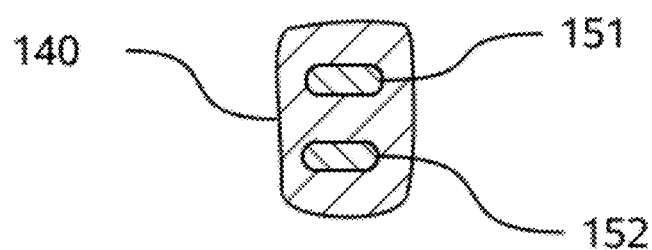
FIG. 3B is a transverse cross-sectional elevation of the handle of FIG. 3A taken at reference line B-B.

In accordance with another embodiment illustrated in FIG. 3, the flange 110 and hanging portion 130 are connected by parallel rectangular shafts 151 and 152 that extend there between. Each shaft is preferably welded at both end to the flange 110 and the hanging portion 130. It should be appreciated that the use of 2 rectangular shafts is merely exemplary to illustrate the benefit of using a connecting member with a non-circular cross-section. This eliminates any tendency that the silicone grip 140 may have to roll or slide after fabrication. Thus, the rod and parallel bars shown in FIGS. 2 and 3 are optionally replaced by an elongated member having a cross-section that is alternatively square, oblong, I-shaped, T shaped, V shaped, H-shaped and the like. It is more preferable however that the shape of the cross-section in addition to being non-circular, also have a through passage that is filled with silicone or other elastomeric material. It is also more preferable if it generally conforms with the shape of the exterior handle to provide a substantially uniform thickness of elastomer for the users to grasp. Such a more preferred embodiment meeting this criteria is now presented in FIGS. 4 and 5.

Figure 4A:
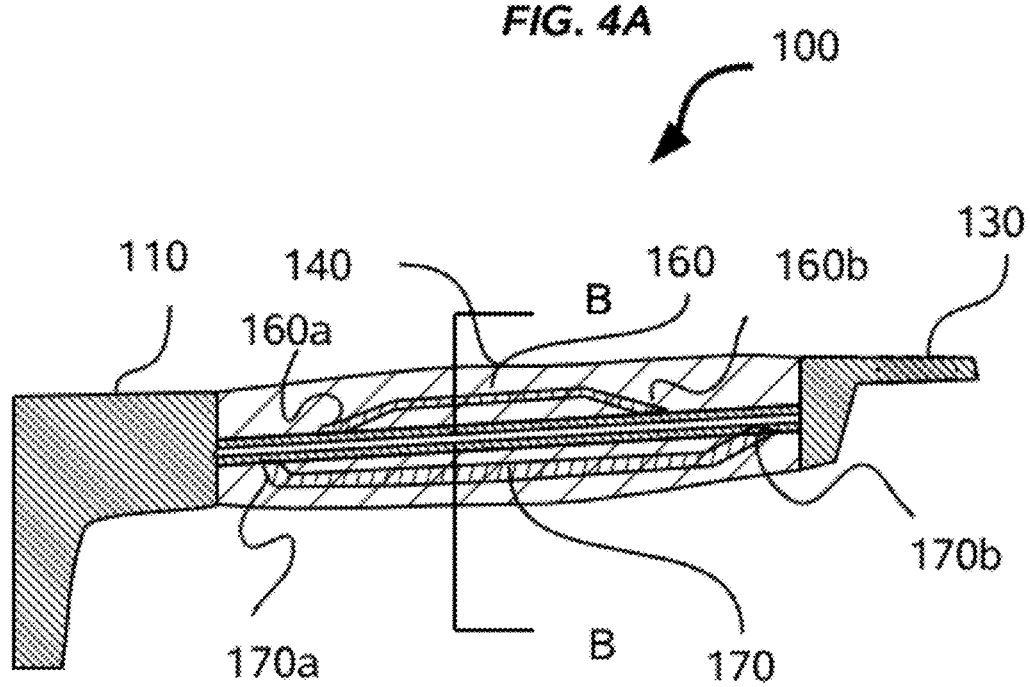
FIG. 4A is a longitudinal cross-sectional elevation of a third embodiment of a cookware handle.
Figure 4B:
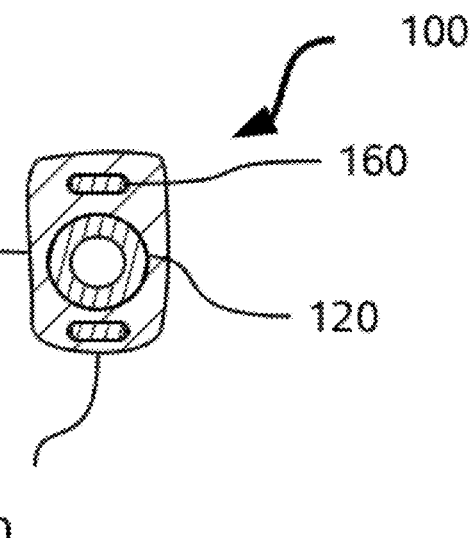
FIG. 4B is a transverse cross-sectional elevation of the handle of FIG. 4A taken at reference line B-B.
Figure 5:
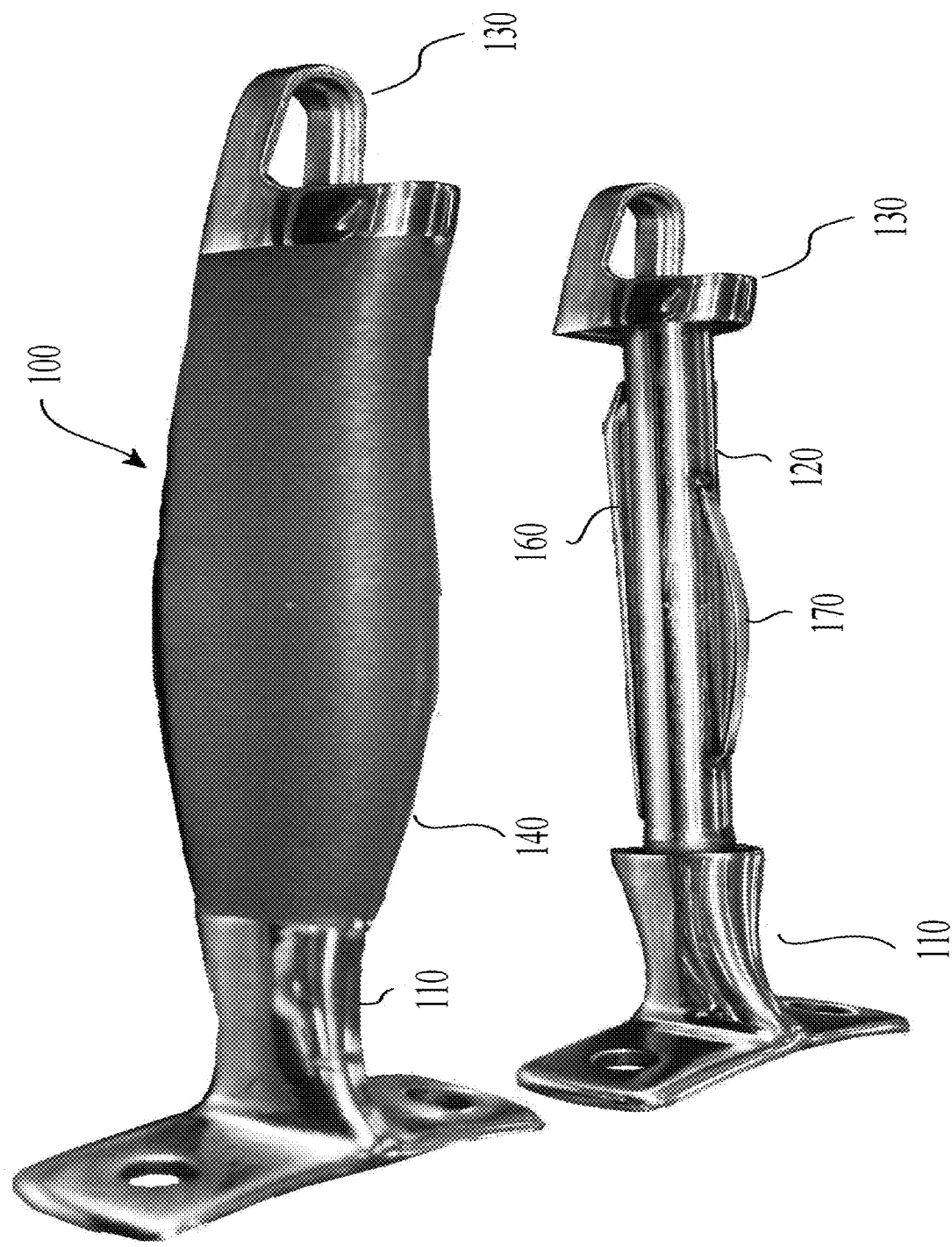
FIG. 5 is a photograph comparing the handle of FIG. 4 before molding (backing) and after (foreground) molding on a silicone grip.

In accordance with the currently preferred embodiment, illustrated in FIGS. 4 and 5, elongated member 120 is a hollow rod that connects the flange 110 and hanging portion 130. Rod 120 is welded at the ends to flange portion 110 and hanging portion 130. At least a first flat and gently curved metal strap 160 and connects to rod 120 at ends 160a and 160b and extends substantially parallel to the rod 120 between these points of attachment. The flat metal strap 160 prevent the soft grip portion 140 from twisting, but is also slightly springy to reinforce the thick elastomer and give the handle 100 a resilient feel when the soft elastomer is tightly grasped and hence greatly compressed. More preferably a flat lower strap 170 is also connected to rod 120 at ends 170a and 170b, being disposed on the opposite side of rod 120 than strap 160. Alternatively, either or both straps 160 and 170 are optionally connected at least at one end to at least one of the flange 110 or the hanging portion 130.

Figure 6A:
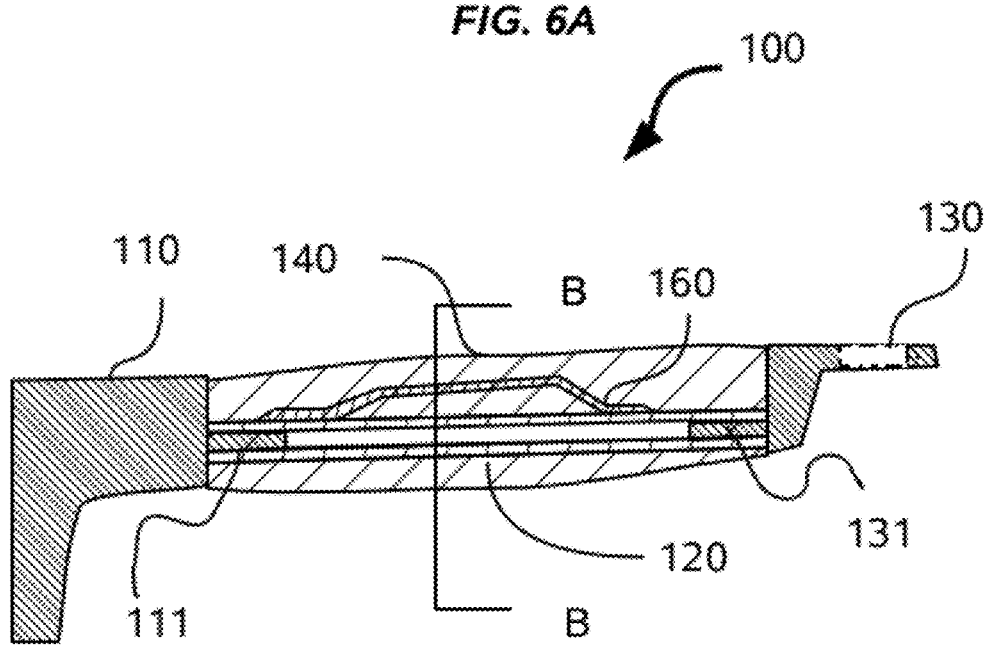
FIG. 6A is a longitudinal cross-sectional elevation of a fourth embodiment of a cookware handle.
Figure 6B:
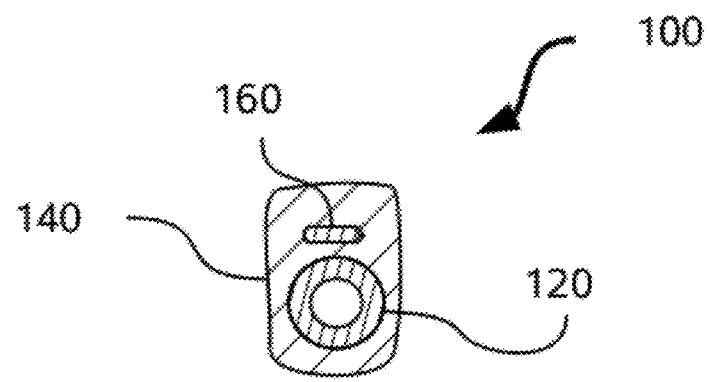
FIG. 6B is a transverse cross-sectional elevation of the handle of FIG. 6A taken at reference line B-B.

In accordance with another embodiment of the invention shown in FIG. 6, the elongated member is a rod 120 attaching the flange 110 and the hanging portion 130 via columnar protrusions 111 and 131 that extend there from respectively. The rod is still preferably welded to each of the flange 120 and the hanging portion 130, but the protrusions are dimensioned so that they fit within the core 160 of rod 120, thus assuring alignment of the flange and hanging portion 130 before welding.

Figure 7A:
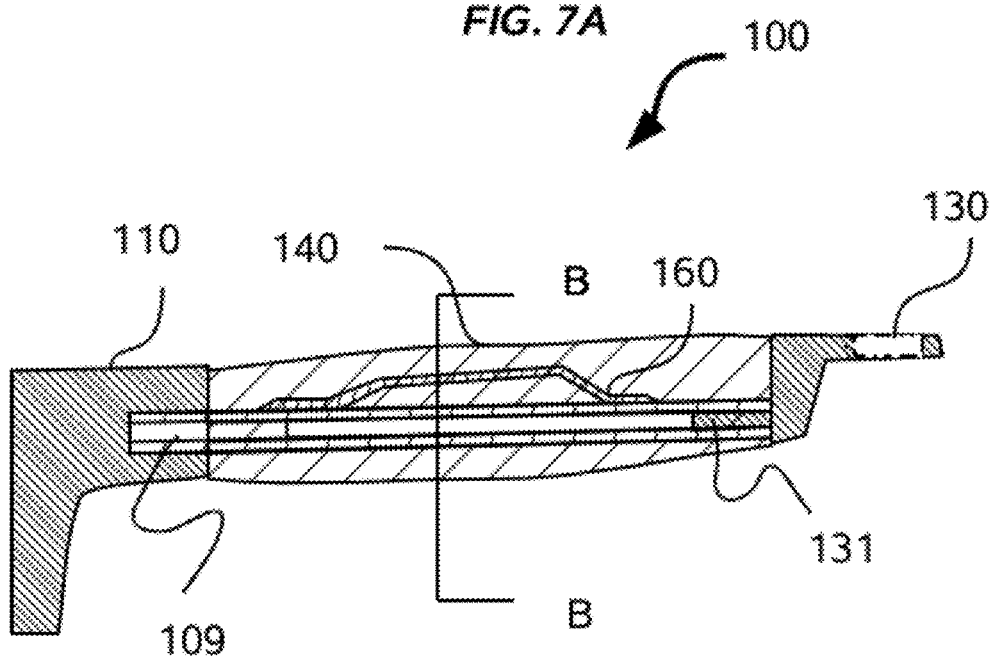
FIG. 7A is a longitudinal cross-sectional elevation of a fifth embodiment of a cookware handle.
Figure 7B:
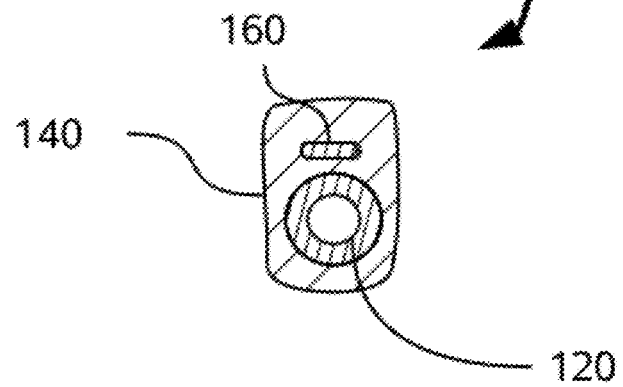
FIG. 7B is a transverse cross-sectional elevation of the handle of FIG. 7A taken at reference line B-B.

FIG. 7 shows another embodiment in which the flange 110 has a circular recess 109 for inserted the end of the rod 120 prior to welding. Although the hanging portion has a protrusion 131 that slides into the core of rod 120, depending on the dimensions and shape of hanging portion 130 it is also possible to provide the same means for attachment as shown for the flange portion 110.

While the invention has been described in connection with preferred embodiments, it is not intended to limit the scope of the invention to the particular form set forth, but on the contrary, it is intended to cover such alternatives, modifications, and equivalents as may be within the spirit and scope of the invention as defined by the appended claims. For example, it should be understood that handle for an article of cookware may be used or connected to such utensils as a cooking vessel to form a pot, pan or any other cooking utensil requiring a handle.

We claim:

1. A handle for a cookware article that comprises:
   a) a flange portion having a first end for attachment to the cookware article and a second end,
   b) a hanging end,
   c) at least one elongated member connecting the second end of flange portion and said hanging end,
   d) at least one strap that extends substantially parallel to said elongated member, the strap being thinner and more flexible that the elongated member and having a proximal end oriented toward the flange portion that is connected to the elongated member and an opposing distal end that is connected to at least one of the hanging end and a portion elongated member oriented toward the hanging end, and
   e) an elastomeric outer layer that completely surrounds both the elongated member and the at least one strap and substantially fills a space between the elongated member and the strap.

2. A cookware handle according to claim 1 wherein the diameter of the elongated member is less than about 6/10 the diameter of an external dimension of the handle.

3. A cookware handle according to claim 1 wherein the diameter of the elongated member is less than about ½ the diameter of an external dimension of the handle.

4. A cookware handle according to claim 3 wherein the at least one strap follows the external contour of the handle.

5. A cookware handle according to claim 1 wherein said at least one strap is a flexible metal ribbon having a substantially narrower thickness than said at least one elongated member.

6. A cookware handle according to claim 1 wherein the at least one strap is , disposed along the elongated member and curved to substantially follow an external contour of the elastomeric outer layer.

7. A cookware handle according to claim I wherein the elongated member is a hollow metal rod of substantially circular cross-section.

8. A cookware handle according to claim 1 further comprising a second strap that extends substantially parallel to said elongated member and is connected at least at one end to at least one of said flange portion, said hanging end and said elongated member.

9. A cookware handle according to claim 1 at least one of said flange and hanging end have an external protrusion for mated engagement with a complimentary mating feature of the elongated member:

10. A cookware handle according to claim I wherein at least one of said flange and said hanging end have a complimentary mating feature to receive an end of said elongated member.

11. A cookware handle according to claim I wherein at least one of said flange and hanging end have a recessed cavity for receiving therein a complimentary mating feature of the elongated member.

12. A cookware handle according to claim 1 wherein the elastomeric outer layer is at least about 4 mm thick.

13. A cookware handle according to claim 12 wherein the elastomeric outer layer is at least about 5 mm thick.

14. An article of cookware comprising:
   a) a vessel having a bottom portion and substantially upright sides surrounding and connected to the bottom portion, the uprights sides terminating at a rim,
   b) at least one handle which comprises:
      i) a flange portion having a first end connected to the upright sides of the vessel and a second end,
      ii) a hanging end,
      iii) a grip portion having:
         (1) at least one elongated member connecting the second end of flange portion and said hanging end,
         (2) at least a first strap that extends substantially parallel to said elongated member and is connected at least at one end to at least one of said flange portion, said hanging end and said elongated member, and the strap being thinner and more flexible than the elongated member,
         (3) an elastomeric outer layer surrounding said elongated member and said first strap.

15. An article of cookware according to claim 14 wherein said first strap is a flexible metal ribbon having a substantially narrower thickness than said at least one elongated member.

16. An article of cookware according to claim 14 wherein said first strap is disposed along the elongated member and curved to substantially follow an external contour of the elastomeric outer layer.

17. An article of cookware according to claim 14 and further comprising a second strap that extends substantially parallel to said elongated member and is connected at least at one end to at least one of said flange portion, said hanging end and said elongated member.

18. An article of cookware according to claim 17 wherein at least one of the first and second strap is disposed along the elongated member and curved to substantially follow an external contour of the elastomeric outer layer.

19. An article of cookware according to claim 14 wherein the elastomeric resin that comprises the outer layer fills a gap between the first strap and the elongated member and surrounds both the strap and the elongated member.

20. A handle for a cookware article that comprises:
   a) a flange portion having a first end for attachment to the cookware article and a second end,
   b) a hanging end,
   c) at least one elongated member connecting the second end of flange portion and said hanging end,
   d) at least one strap that extends substantially parallel to said elongated member, the strap being thinner and more flexible that the elongated member and having a proximal end oriented toward the flange portion that is connected to the elongated member and an opposing distal end that is connected to at least one of the hanging end and a portion elongated member oriented toward the hanging end, and wherein said at least one strap is a flexible metal ribbon having a substantially narrower thickness than said at least one elongated member,
   e) an elastomeric outer layer that completely surrounds both the elongated member and the at least one strap.

* * * * *